W. Estabrook.
Churn.
Patented Nov. 19, 1833.
7,803—X
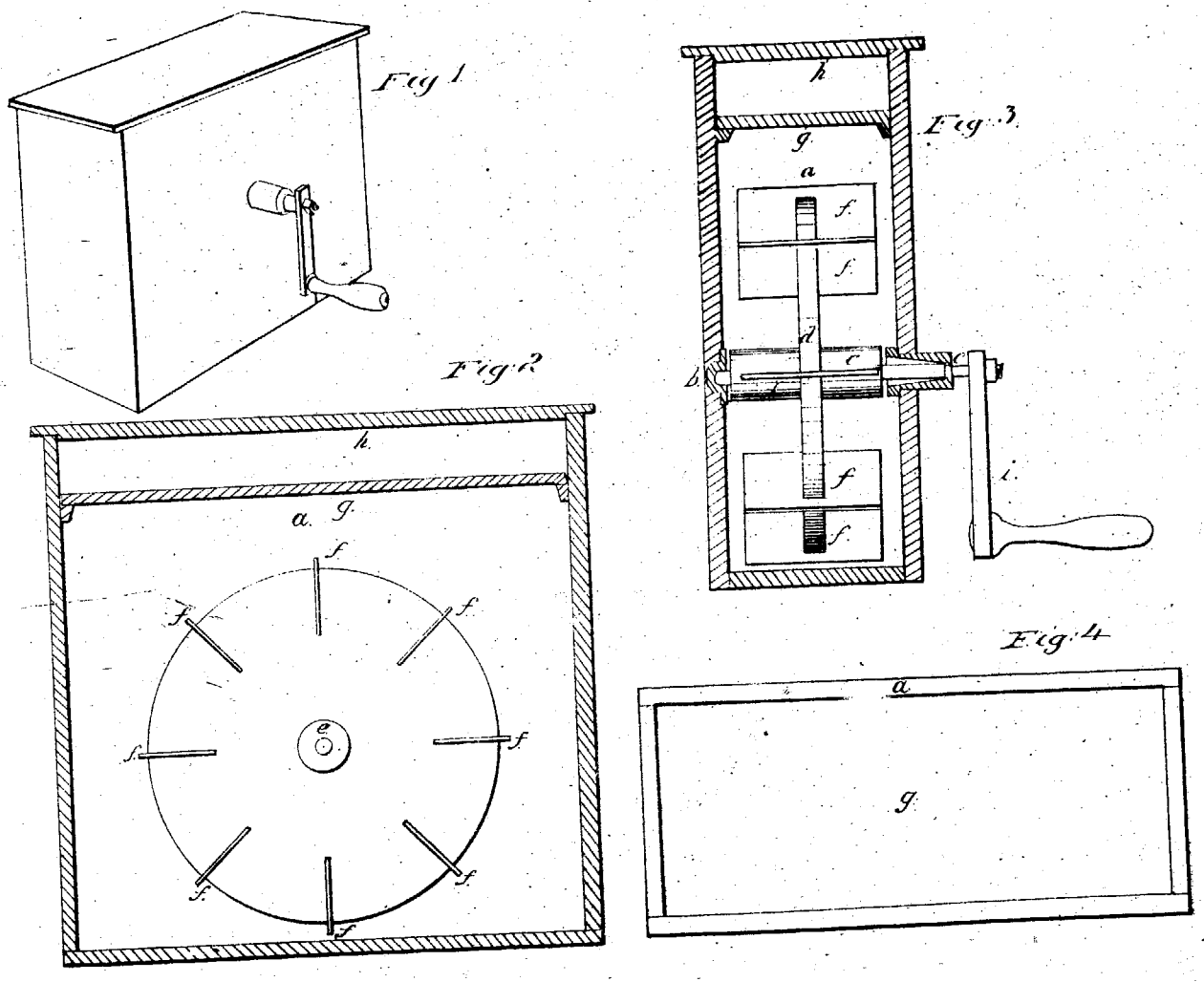

7803X Novem 19. 1833

Warren Estabrook of Salem Ohio
Letters Patent.

The schedule referred to in these Letters Patent and making part of the same containing a description in the words of the said Warren Estabrook himself of his improvement in the Churn To all whom these presents shall come Be it known that I, Warren Estabrook of Salem in the County of Montgomery, and State of Ohio, have invented a new & useful improvement in the machine for the manufacture of Butter, of which the following is an exact description of the construction and operation: — An oblong square chest two feet in height, two feet in length, and eight inches wide (larger or smaller in like proportion) constructed of plank put together by inserting a tongue on the end pieces and bottom into grooves or furrows in the side pieces and fastened with screws or nails.

An axis of wood or iron of suitable size passes through the chest widthwise nine inches from the bottom. One end of the axis runs in a large wood or metal Box inserted half way through the plank inside the chest, the other end passes through the plank two inches, and turns in a hard wood or metal box four inches long two inches of which passes through inside the chest. The hole at the inside end of the long box is larger than the gudgeon of the axis and tapers from the inside end two inches and terminates with a shoulder, to prevent the cream from running out, and also the axis from slipping. The axis has a shoulder to it to match the one in the Box. On the centre of the axis there is a plank wheel sixteen inches in diameter stationary to the axis. in the edge of said wheel six or eight pieces of thin plank or buckets seven inches long and four or five wide are inserted transversely by cutting slits in the edge of the wheel and in the side of the pieces of plank sufficiently deep to have them project three Drawing [illegible]

7803X fourths of an inch outside the edge of the wheel. An under lid layes upon small strips of wood fast aroundinside the chest about three inches from the top to prevent the cream from coming in contact with the main lid which layes upon the top and projects one inch over the sides and ends. A crank of wood or iron is attached to the end of the axis by turning which the cream is thrown with velocity against the end of the chest and falling to the bottom consequently forms a current running against the wheel. and thereby receiving a greater agitation.

Witnesses
Michael Miller
J. O. Shoup

Warren Estabrook

[illegible] 7742

Patented November 19. 1833.

Received & Recorded May 29th 1838.—